United States Patent
Brown et al.

(10) Patent No.: US 11,182,373 B2
(45) Date of Patent: Nov. 23, 2021

(54) UPDATING CHANGE INFORMATION FOR CURRENT COPY RELATIONSHIPS WHEN ESTABLISHING A NEW COPY RELATIONSHIP HAVING OVERLAPPING DATA WITH THE CURRENT COPY RELATIONSHIPS

(71) Applicant: INTERNATIONAL BUSINESS MACHINES CORPORATION, Armonk, NY (US)

(72) Inventors: Theresa M. Brown, Tucson, AZ (US); Nedlaya Y. Francisco, Tucson, AZ (US); Suguang Li, Tucson, AZ (US); Mark L. Lipets, Tucson, AZ (US); Gregory E. McBride, Vail, AZ (US); Carol S. Mellgren, Tucson, AZ (US); Raul E. Saba, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 154 days.

(21) Appl. No.: 16/581,564

(22) Filed: Sep. 24, 2019

(65) Prior Publication Data
US 2020/0019542 A1  Jan. 16, 2020

Related U.S. Application Data

(63) Continuation of application No. 15/372,163, filed on Dec. 7, 2016, now abandoned.

(51) Int. Cl.
*G06F 16/23*  (2019.01)
*G06F 16/27*  (2019.01)
(Continued)

(52) U.S. Cl.
CPC ........ *G06F 16/2358* (2019.01); *G06F 16/128* (2019.01); *G06F 16/27* (2019.01);
(Continued)

(58) Field of Classification Search
CPC .... G06F 16/2358; G06F 16/128; G06F 16/27; G06F 16/2477; G06F 16/178; G06F 2201/84
See application file for complete search history.

(56) References Cited

U.S. PATENT DOCUMENTS 7,461,100 B2   12/2008   Spear et al.
8,285,679 B2   10/2012   Agombar et al.
(Continued)

OTHER PUBLICATIONS

C. Burger, et al., "IBM System Storage DS8000 Series: IBM FlashCopy SE", IBM Corporation, Red Paper Document REDP-4368-00, Feb. 2008, p. 80.
(Continued)

*Primary Examiner* — Dangelino N Gortayo
(74) *Attorney, Agent, or Firm* — Konrad Raynes Davda & Victor LLP; David W. Victor

(57) ABSTRACT

Provided are a computer program product, system, and method for updating change information for current copy relationships when establishing a new copy relationship having overlapping data with the current copy relationships. A first copy relationship indicates changed first source data to copy to first target data. An establish request is processed to create a second copy relationship to copy second source data in to second target data. A second copy relationship is generated, in response to the establish request, indicating data in the second source data to copy to the second target data. A determination is made of overlapping data units in the first source data also in the second target data. Indication is made in the first copy relationship to copy the overlapping data units. The first source data indicated in the first copy
(Continued)

relationship is copied to the first target data, including data for the overlapping data units.

20 Claims, 6 Drawing Sheets

(51) Int. Cl.
  *G06F 16/2458* (2019.01)
  *G06F 16/11* (2019.01)
  *G06F 16/178* (2019.01)
  *G06F 11/14* (2006.01)
(52) U.S. Cl.
  CPC ........ *G06F 11/1448* (2013.01); *G06F 16/178* (2019.01); *G06F 16/2477* (2019.01); *G06F 2201/84* (2013.01)

(56) References Cited

U.S. PATENT DOCUMENTS

| | | | | |
|---|---|---|---|---|
| 8,352,681 | B2* | 1/2013 | Sakai | G06F 3/065 |
| | | | | 711/120 |
| 8,447,941 | B2* | 5/2013 | Kono | G06F 3/0605 |
| | | | | 711/162 |
| 8,555,010 | B2 | 10/2013 | Yuhara et al. | |
| 8,606,767 | B2 | 12/2013 | Brown et al. | |
| 8,620,973 | B1 | 12/2013 | Veeraswamy et al. | |
| 8,706,999 | B2 | 4/2014 | Agombar et al. | |
| 8,745,006 | B2 | 6/2014 | Hiwatashi et al. | |
| 8,751,765 | B2 | 6/2014 | Nakamura | |
| 9,075,723 | B2 | 7/2015 | Benhase et al. | |
| 9,086,818 | B2 | 7/2015 | Benhase et al. | |
| 9,244,967 | B2* | 1/2016 | Provenzano | G06F 16/185 |
| 9,563,517 | B1 | 2/2017 | Natanzon et al. | |
| 9,753,813 | B1 | 9/2017 | Fan et al. | |
| 9,830,105 | B1 | 11/2017 | Tummala et al. | |
| 9,983,815 | B1 | 5/2018 | Brown et al. | |
| 10,042,581 | B2 | 8/2018 | Brown et al. | |
| 2009/0319567 | A1* | 12/2009 | Frazer | G06F 16/289 |
| 2010/0106684 | A1* | 4/2010 | Pizzo | G06F 16/275 |
| | | | | 707/610 |
| 2011/0161295 | A1 | 6/2011 | Ngo | |
| 2012/0124012 | A1* | 5/2012 | Provenzano | G06F 16/152 |
| | | | | 707/692 |
| 2014/0108345 | A1 | 4/2014 | Brown et al. | |
| 2014/0208051 | A1 | 7/2014 | Agombar et al. | |
| 2015/0143168 | A1 | 5/2015 | Beeken | |
| 2015/0286429 | A1 | 10/2015 | Dain et al. | |
| 2015/0378854 | A1 | 12/2015 | Hatfield | |
| 2016/0216909 | A1* | 7/2016 | Provenzano | G06F 3/0641 |
| 2018/0052617 | A1 | 2/2018 | Abbott et al. | |

OTHER PUBLICATIONS

B. Dufrasne, et al., "DS8000 Thin Provisioning", IBM Corporation, Red Paper Document REDP-4554-01, Jul. 2014, p. 122.
"DFSMS Advanced Copy Services", IBM Corporation, Document No. SC35-0428-19, 2011, p. 814.
J. Tate, et al., "IBM System Storage SAN Volume Controller and Storwize V7000 Replication Family Services", IBM Corporation, Document No. SG24-7574-02, Mar. 2013, p. 538.
U.S. Appl. No. 15/372,154, filed Dec. 7, 2016.
U.S. Appl. No. 15/372,192, filed Dec. 7, 2016.
U.S. Appl. No. 15/372,163, filed Dec. 7, 2016.
Office Action dated Sep. 19, 2018, pp. 27, for U.S. Appl. No. 15/372,163, filed Dec. 7, 2016.
Response dated Dec. 19, 2018, pp. 17, to Office Action dated Sep. 19, 2018, pp. 27, for U.S. Appl. No. 15/372,163, filed Dec. 7, 2016.
Final Office Action dated Apr. 15, 2019, pp. 21, for U.S. Appl. No. 15/372,163, filed Dec. 7, 2016.
Response dated Jun. 17, 2019, pp. 13, to Final Office Action dated Apr. 15, 2019, pp. 21, for U.S. Appl. No. 15/372,163, filed Dec. 7, 2016.
Notice of Allowance dated Jul. 24, 2019, pp. 10, for U.S. Appl. No. 15/372,163, filed Dec. 7, 2016.
"FlashCopy mappings", [online][retrieved Nov. 26, 2016] http://publib.boulder.ibm.com/infocenter/flexsys/information/topic/com . . . , pp. 5.
"Incremental FlaschCopy", IBM Corporation, [online][retrieved Nov. 23, 2016] http://www.ibm.com/support/knowledgecenter/SSLTBW_2.1.0/com.ibm.z . . . , pp. 3.

* cited by examiner

UPDATING CHANGE INFORMATION FOR CURRENT COPY RELATIONSHIPS WHEN ESTABLISHING A NEW COPY RELATIONSHIP HAVING OVERLAPPING DATA WITH THE CURRENT COPY RELATIONSHIPS

BACKGROUND OF THE INVENTION

1. Field of the Invention

The present invention relates to a computer program product, system, and method for updating change information for current copy relationships when establishing a new copy relationship having overlapping data with the current copy relationships.

2. Description of the Related Art

In a storage environment, a storage controller may create point-in-time ("PiT") copies of a production volume using point-in-time copy techniques, such as the IBM Flash-Copy® (FlashCopy is a registered trademark of IBM), snapshot, etc. A point-in-time copy replicates data in a manner that appears instantaneous and allows a host to continue accessing the source volume while actual data transfers to the copy volume are deferred to a later time. The point-in-time copy appears instantaneous because Input/Output ("I/O") complete is returned to the copy operation in response to generating the relationship data structures without copying the data from the source to the target volumes. Point-in-time copy techniques typically defer the transfer of the data in the source volume at the time the point-in-time copy relationship was established to the copy target volume until a write operation is requested to that data block on the source volume. Data transfers may also proceed as a background copy process with minimal impact on system performance. The point-in-time copy relationships that are immediately established in response to the point-in-time copy command include a bitmap or other data structure indicating the location of blocks in the volume at either the source volume or the copy volume. The point-in-time copy comprises the combination of the data in the source volume and the data to be overwritten by the updates transferred to the target volume.

For an incremental FlashCopy®, after an incremental copy is established, change recording information for the FlashCopy® relationship keeps of tracks in the source volume that are updated. The updated tracks from the source volume indicated in the change recording information are copied over to the target volume of the FlashCopy® when a subsequent incremental FlashCopy® is established for the source volume. In this way, only the updated tracks indicated in the change recording information are copied over.

The target volume of the incremental FlashCopy relationship may be write inhibited or writes allowed. If writes are allowed, then separate target change recording information is needed to keep track of tracks from the target volume that are updated so they will not be overwritten by data from changed tracks from the source volume copied to the target volume.

There is a need in the art for improved techniques for managing multiple point-in-time copies that have common source and target data.

SUMMARY

Provided are a computer program product, system, and method for updating change information for current copy relationships when establishing a new copy relationship having overlapping data with the current copy relationships. A first copy relationship indicates changed first source data in one of the at least one storage to copy to first target data in one of the at least one storage. An establish request is processed to create a second copy relationship to copy second source data in one of the at least one storage to second target data in one of the at least one storage. A second copy relationship is generated, in response to the establish request, indicating data in the second source data to copy to the second target data. A determination is made of overlapping data units in the first source data also in the second target data. Indication is made in the first copy relationship to copy the overlapping data units at the first source data to the first target data. The first source data indicated in the first copy relationship is copied to the first target data, including data for the overlapping data units.

DETAILED DESCRIPTION

In a backward cascade relationship, a new copy relationship may be established to copy a source volume to a target volume, where the target volume comprises the source volume of an existing copy relationship, such as an incremental copy relationship that copies changes to the data. Because the new copy relationship to establish will modify the source data of the already existing incremental copy relationship, if the change recording information of the existing incremental copy relationship is not set to copy the source data of the new copy relationship, then the correct data will not be copied in the already existing incremental relationship.

Described embodiments provide techniques to ensure that the data written from the new copy relationship to the source data of an existing incremental copy relationship is copied to the target data of the existing incremental relationship by determining overlapping data units in the target volume of the new copy relationship and the source volume of the existing incremental copy relationship. Indication is made in the existing incremental copy relationship to copy the overlapping data units at the source data of the existing copy relationship to the target volume of the existing copy relationship. In this way, described embodiments address the situation where copy operations for a new copy relationship to establish will affect the source data to copy for an already existing copy relationship.

Figure 1:
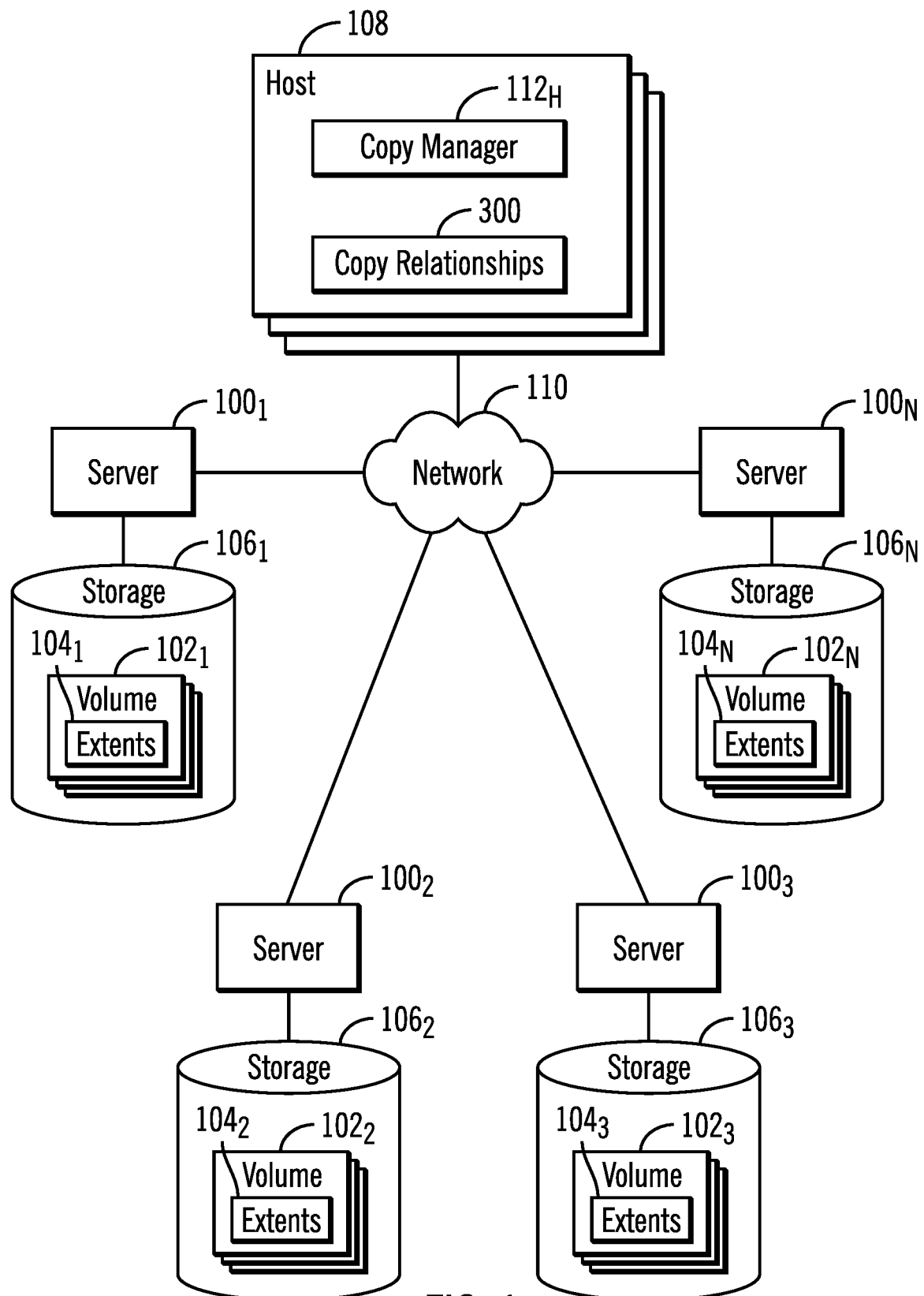
FIG. 1 illustrates an embodiment of a storage environment.

FIG. 1 illustrates an embodiment of a data storage environment having a plurality of servers $100_1$, $100_2$, $100_3$ . . . $100_N$ managing access to volumes $102_1$, $102_2$, $102_3$ . . . $102_N$ of extents $104_1$, $104_2$, $104_3$ . . . $104_N$ configured in storages $106_1$, $106_2$, $106_3$ . . . $106_N$. Host systems 108 perform read and write operations with respect to the volumes $102_1$, $102_2$, $102_3$ . . . $102_N$ over a network 110. Extents $104_1$, $104_2$, $104_3$ . . . $104_N$ comprise groupings of tracks, blocks or other data units that is assigned to volumes $102_1$, $102_2$, $102_3$ . . . $102_N$.

The host 108 includes a copy manager program $112_H$ to generate requests to establish point-in-time copies of source data in one of the volumes $102_1$, $102_2$, $102_3$ . . . $102_N$ to target data in another of the volumes $102_1$, $102_2$, $102_3$ . . . $102_N$ by submitting a point-in-time copy establish request to the servers $100_1$, $100_2$, $100_3$ . . . $100_N$. The point-in-time copies are defined in copy relationships 300 maintained in the host 106 and servers $100_1$, $100_2$, $100_3$ . . . $100_N$.

Figure 2:
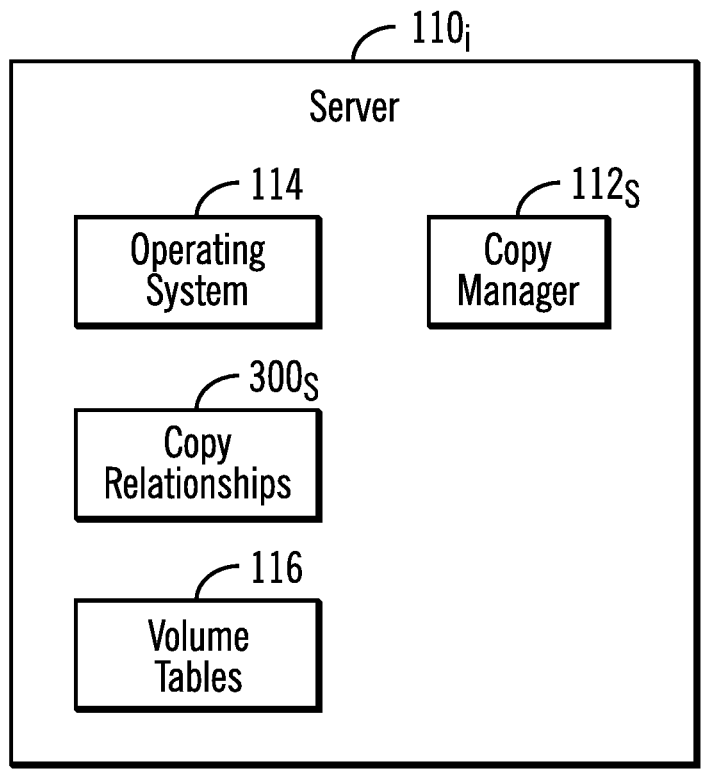
FIG. 2 illustrates an embodiment of components in a storage server.

FIG. 2 shows the components included in each of the servers $100_1$, $100_2$, $100_3$ . . . $100_N$, including an operating system 114 and a point-in-time copy manager 112 to create and manage point-in-time copies, e.g., FlashCopy, snapshot, etc., in response to PiT copy establish requests from the host system 108 copy manager $112_H$ When creating a PiT copy, the server copy manager $112_S$ generates copy relationships 300 having information on the PiT copy created as of a point-in-time.

The operating system 114 in the servers $100_1$, $100_2$, $100_3$ . . . $100_N$ assigns extents of tracks in the storage $106_1$, $106_2$, $106_3$ . . . $106_N$ to the volumes $102_1$, $102_2$, $102_3$ . . . $102_N$, where data is stored in data units, such as tracks, logical block addresses (LBAs), extents, etc. An extent comprises a grouping of tracks, blocks or other data units that is assigned to volumes $102_1$, $102_2$, $102_3$ . . . $102_N$. The operating system 114 maintain volume tables 116 providing information on the configured volumes $102_1$, $102_2$, $102_3$ . . . $102_N$ The operating system 114 further manages I/O requests from the host systems 108 with respect to the volumes $102_1$, $102_2$, $102_3$ . . . $102_N$.

The storages $106_1$, $106_2$, $106_3$ . . . $106_N$ may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The volumes $102_S$, $102_T$ may further be configured from an array of devices, such as Just a Bunch of Disks (JBOD), Direct Access Storage Device (DASD), Redundant Array of Independent Disks (RAID) array, virtualization device, etc. Further, the storages $106_1$, $106_2$, $106_3$ . . . 106N may comprise heterogeneous storage devices from different vendors and different types of storage devices, such as a first type of storage devices, e.g., hard disk drives, that have a slower data transfer rate than a second type of storage devices, e.g., SSDs.

The network 110 may comprise a network such as one or more interconnected Local Area Networks (LAN), Storage Area Networks (SAN), Wide Area Network (WAN), peer-to-peer network, wireless network, etc.

Figure 3:
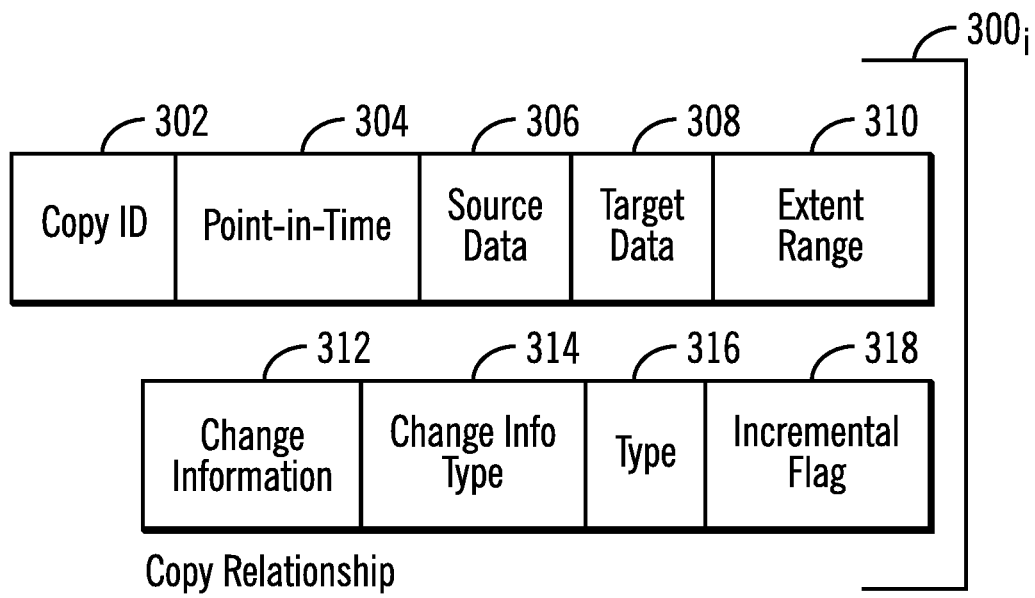
FIG. 3 illustrates an embodiment of a copy relationship.

FIG. 3 illustrates an instance of a copy relationship $300_i$, which may include a PiT copy identifier 302 identifying the PiT copy created by the copy manager $112_i$ (i.e., $112_H$, 112s) at a server $100_i$; a point-in-time 304 of the PiT copy 302, such that data is consistent as of that point-in-time 304; source data 306, e.g., source volume $102_i$ at a source server $100_i$, from which data is copied; target data 308, e.g., target volume $102_i$, at a target server $100_i$ to which the PiT data is copied; an extent range 310 indicating an entire volume $102_i$ or a range of extents from a start track in a volume $102_i$ comprising the source data in a volume $102_i$; change information 312, such as a change recording bitmap, indicating source 306 or target data 308 that has been updated or changed; change information type 314 indicting whether the change information 312 is source or target, where source change information 312 indicates source data 306 updated since the point-in-time 304 that needs to be copied to corresponding target data 308 and where target change information 314 indicates target data 308 that has been separately updated since the point-in-time; a copy relationship type 316, where a first type copy relationship may indicate that both source and target copy relationships $300_S$ and $300_T$ are separately maintained to separately maintain source and target change information 312 indicating changes to the source data 306 and target data 308, respectively, and where a second type copy relationship may indicate that there is only a source and target copy relationship information on the target server such that the change information 312 indicates source data 306 and target data 308 updated since the point-in-time 304, where the updated source data needs to be copied to the target data 308; and an incremental flag 318 indicating whether the copy relationship $300_i$ is for an incremental copy where only source data 306 that has changed since the point-in-time copy is copied to the target data 308 or a non-incremental copy having source data 306 as of the point-in-time before being changed.

In described embodiments, the source data 306 and target data 308 are in different volumes $102_1$, $102_2$, $102_3$ . . . $102_N$ managed by different servers $100_1$, $100_2$, $100_3$ . . . $100_N$. Alternatively, the source 306 and target data 308 of a copy relationship may be on the same volume in the same storage 106i.

A non-incremental copy relationship change information may indicate the full source data that needs to be copied to the target data, and the information for a track is only reset when the track or data unit as of the point-in-time is copied to the target data.

In one embodiment, the host copy manager $112_H$ may generate a point-in-time copy establish request to create a copy relationship, where the establish request may include all the information in copy relationship $300_i$ information. If the copy relationship to establish comprises an incremental first type of copy relationship, then the copy manager $112_S$ at the source server $100_S$ having the source data for the copy relationship to establish may create a source copy relationship $300_S$ information where the change information 314 indicates source data at a source volume $102_S$ that has changed since the point-in-time 304 to copy to the target data 308. The copy manager $112_S$ may then communicate to the target copy manager $112_T$ at the target server $100_T$ to create a target copy relationship $300_T$ information where the change information 312 indicates target data 308 that has been updated by a separate host 108 independent of the source copy relationship $300_S$. Such updates at the target are indicated so the changed source data will not be copied over target data 308 indicated as changed in the target change information 312.

If the copy relationship to establish comprises a second type of copy relationship, then the source copy manager $112_S$ communicates the copy establish request to the target copy manager $112_T$ to create a target copy relationship $300_T$ where the change information 314 indicates changed source data 306 to copy to the target data 308, and may also indicate tracks in the target data 308 that have been updated. For the second type of copy relationship, upon updating source data 306, the source copy manager $112_S$ would inform the target copy manager $112_T$ of the data changed, and the target copy manager $112_T$ would update the target change information 312 in the target copy information $300_T$ to indicate the changed data and the target copy manager $112_T$ may further indicate changes to the target data 308 in the target copy relationship $300_T$.

Changed source data 306, indicated in the change information 312 for source copy relationship $300_S$ for a first type copy relationship or target copy relationship $300_T$ for second type of copy relationship, is copied over to the target data 308 when a subsequent incremental copy relationship is established for the source data 306.

The creation of the copy relationships $300_S$, $300_T$ appears instantaneous and allows host processes to continue accessing source data 306 of the copy relationship while actual data transfers to the target data of the copy relationship copy volume are deferred to a later time. For a non-incremental point-in-time copy relationship, source data 306 as of the point-in-time is copied to the target data 308 when updated, such that the source data 306 is copied before being updated. For an incremental point-in-time copy, changed source data changed after the point-in-time is copied to the target data 308 when a subsequent incremental copy relationship is established. The point-in-time copy establishment appears instantaneous because the source copy manager $112_S$ returns I/O complete to the host copy manager $112_H$ in response to generating the relationship data structures without copying the data.

Figure 4:
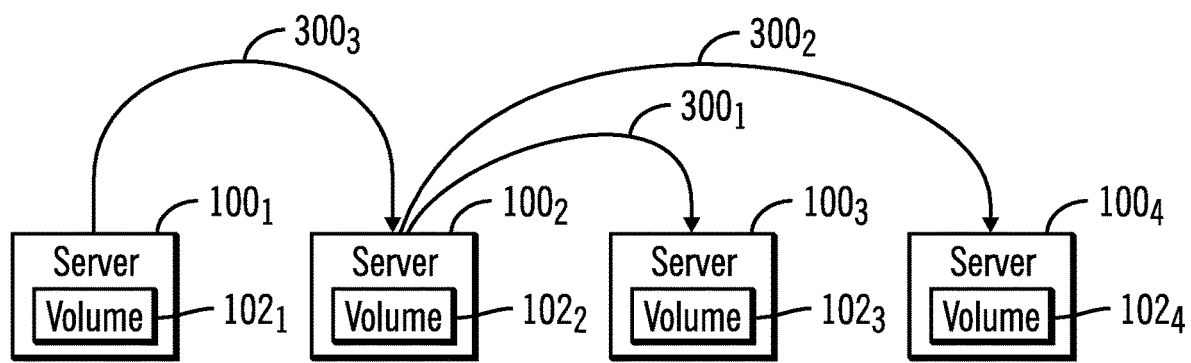
FIG. 4 illustrates an example of multiple copy relationships established between storage servers.

FIG. 4 illustrates a backward cascade copy relationships $300_3$ being established. Initially an incremental copy relationship $300_k$ is established to copy source data 306 from a volume $102_2$ on server $100_2$ to target data 306 on server $102_3$. An additional incremental copy relationship $300_2$ is established to copy source data 306 from the volume $102_2$ on server $100_2$ to copy to target data 306 in volume $102_4$ on server $100_4$. After the incremental copy relationships $300_1$, $300_2$ are established, the host 106 may establish a third copy relationship $300_3$ from source data 306 in the volume $102_1$ to target data 308 in the volume $102_2$, which may overlap with the source data of copy relationships $300_1$, $300_2$. Described embodiments provide techniques to maintain the integrity of the existing incremental copy relationships $300_1$, $300_2$ when a backward cascade relationship is established to copy source data from a volume to the source data of the existing incremental relationships.

In one embodiment, the backwards cascade relationship $300_3$ would be non-incremental if the current relationship $300_2$, whose source data is the target data of the backwards cascade relationship $300_3$, comprises a first type incremental relationship. In a further embodiment, the backward cascade relationship $300_3$ may be a first or second type incremental copy relationship if the current incremental copy relationship $300_2$, whose source data is the target data of the backwards cascade relationship $300_3$, comprises a second type incremental copy relationship.

Figure 5A:
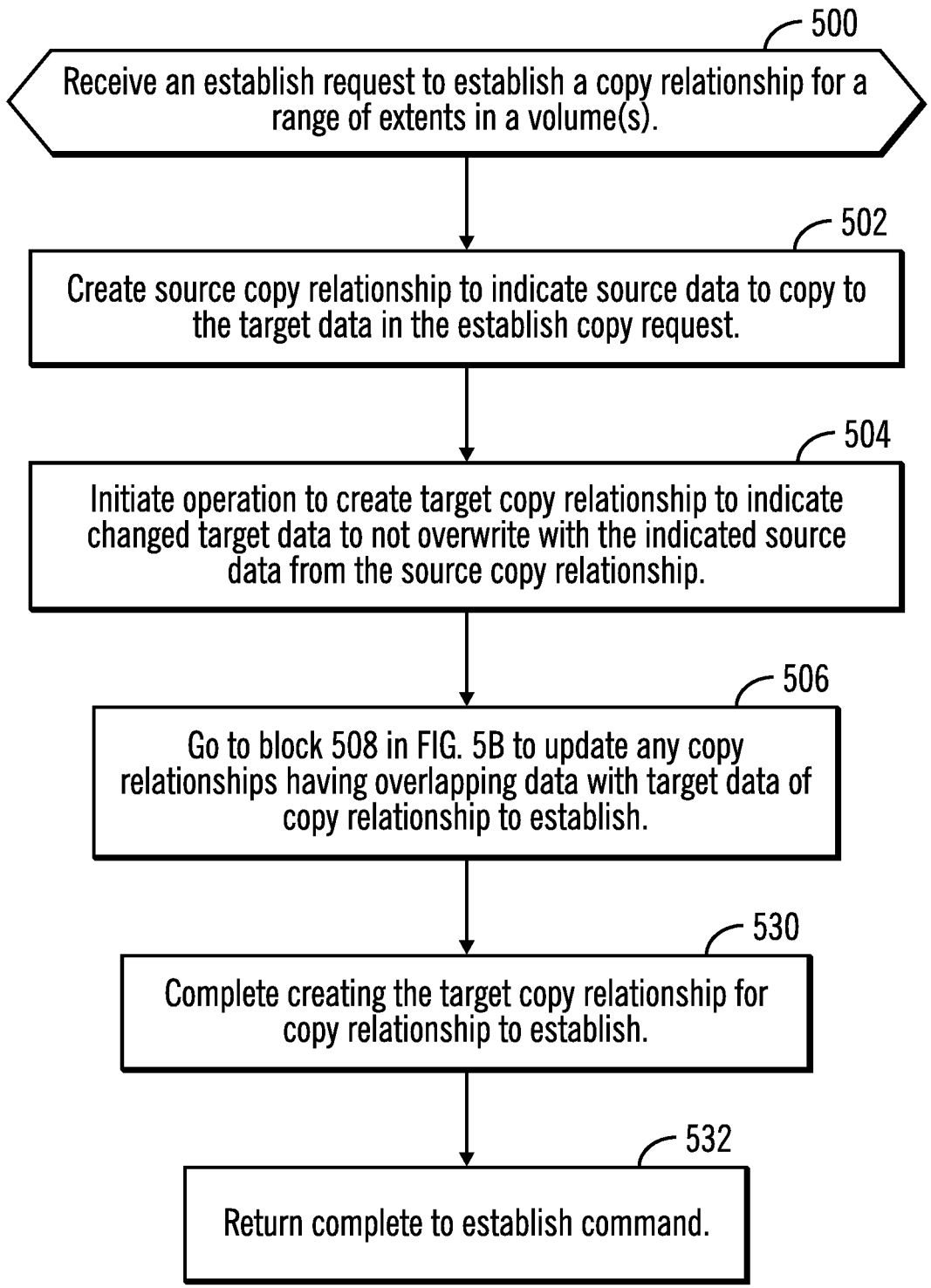
FIGS. 5a and 5b illustrate an embodiment of operations to establish a point-in-time copy relationship when the target data of the copy relationship to establish comprises source data of an existing copy relationship.
Figure 5B:
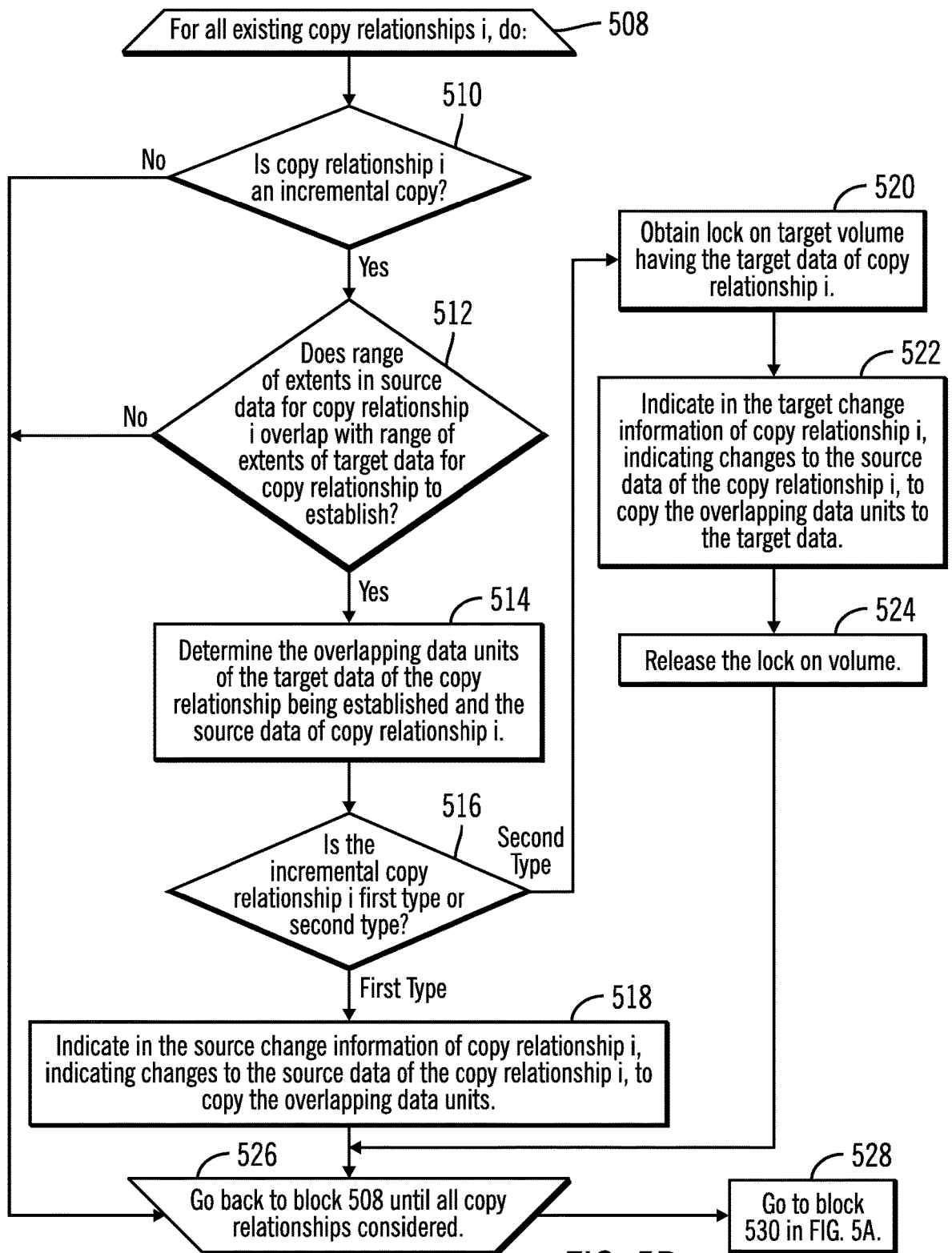

FIGS. 5a and 5b illustrate an embodiment of operations performed by at least one of the copy managers 112i, such as at least one of the host $112_H$, source server $112_S$, and target server $112_T$ copy managers to establish a copy relationship. The source copy manager $112_S$ in the source server $100_S$ managing the source data of the copy relationship to establish receives (at block 500) from the host copy manager $112_H$ a request to establish an incremental or non-incremental point-in-time copy relationship for a range of extents in a source volume $102_S$. In response, the source copy manager $112_S$ creates (at block 502) a source copy relationship $300_S$ to indicate a range of extents 310 of the source data 306 in a source volume $102_S$ to copy to target data 308 in a target volume $102_T$, as well as other information, such as the incremental flag 318 indicating an incremental or non-incremental copy and, if an incremental copy, a type 316, whether it is a first type or second type of incremental copy operation. The source $112_S$ or target $112_T$ copy manager may then initiate (at block 504) an operation to create a target copy relationship $300_T$ to provide change information 312 of changed target data to not overwrite with the indicated changed source data from the source copy relationship $300_S$. The source $300_S$ and target $300_T$ copy relationships would have common information for fields 304, 306, 308, but have different change information 312 and change information type 314 indicating whether the change information 312 is for the source or target copy relationship, and have same or different source and target extent ranges 310 in a copy relationship.

The operation at block 504 may be performed if the copy relationship being established is a non-incremental copy relationship or an incremental first type of copy relationship. If the relationship being established comprises an incremental second type of copy relationship, then the source copy relationship would not be created at block 502 and the target copy relationship at block 504 would be used to indicate changes to the source data that need to be copied to the target data and changes to the target data 308, such that changed tracks in the target data 308 should not be updated with the changes from the source data 306.

Control then proceeds (at block 506) to block 508 in FIG. 5b to update any other copy relationships $112_i$ having source data 306 that overlaps with the target data 308 of the copy relationship being created. Blocks 508 through 521 provide a loop of operations to perform for existing copy relationships $300_i$ in the system For each copy relationship $300_i$, if (at block 510) copy relationship $300_i$ is for an incremental copy operation, as indicated in the incremental flag 318, and if (at block 512) the extent range 310 in the source 306 data for the copy relationship $300_i$ overlaps with the extent range 310 of the copy relationship being established, then the source copy manager $112_S$ determines (at block 514) the overlapping data units of the target data 308 of the copy relationship being established and the source data 306 of the existing incremental copy relationship $300_i$ being considered.

If (at block 516) the incremental copy relationship $300_i$ is a first type copy relationship, then the source copy manager $112_S$ indicates (at block 518) in the source change information 312 of the existing incremental copy relationship $300_i$ to copy the overlapping data units to the target storage 308.

If (at block 516) the incremental copy relationship $300_i$ is a second type copy relationship, then the target copy manager $112_T$ of the volume $102_T$ having the target data 308 obtains (at block 520) a lock on the target volume $102_T$ having the target data 308. The target copy manager $112_T$ indicates (at block 522) in the target change recording information 312 of copy relationship 300i (indicating changed source data 306 to copy) the overlapping data units, e.g., tracks, as changed so they will be copied to the target data 308. The lock on the target volume $102_T$ having the target data 308 is then released (at block 524) and control proceeds (at block 528) to block 530 in FIG. 5a to continue establishing the copy relationship.

At block 530 in FIG. 5a, the copy manager 112i completes (at block 530) creating the target copy relationship $300_T$ for the copy relationship to establish $300_E$ and returns (at block 532) complete to the establish command from the host copy manager $112_H$.

With the operations of FIGS. 5a and 5b, when creating an incremental or non-incremental copy relationship to copy source data to target data, if the source data of an existing copy relationship is in a backward cascade relationship such that it is the target data of the new copy relationship to establish, then the change information of the changed source data to copy for this additional incremental copy relationship is updated to indicate overlapping data units between the target data of the copy relationship being created and the source data of a pre-existing incremental copy relationship. This ensures that when the overlapping data units in the target data of the new copy relationship being created is updated, as a result of processing the new copy relationship, the change information, for another copy relationship that has source data comprising the target data of the new copy relationship, is updated to indicate that the overlapping data units need to be copied to the target data of the other forward incremental copy relationship. This updating of change information across copy relationships ensures that source data in one copy relationship updated by another copy relationship remains consistent through all the copy relationships in which it is included.

The reference characters used herein, such as i, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the host 108 and the servers $100_1$, $100_2$, $100_3$ ... $100_N$ may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

Figure 6:
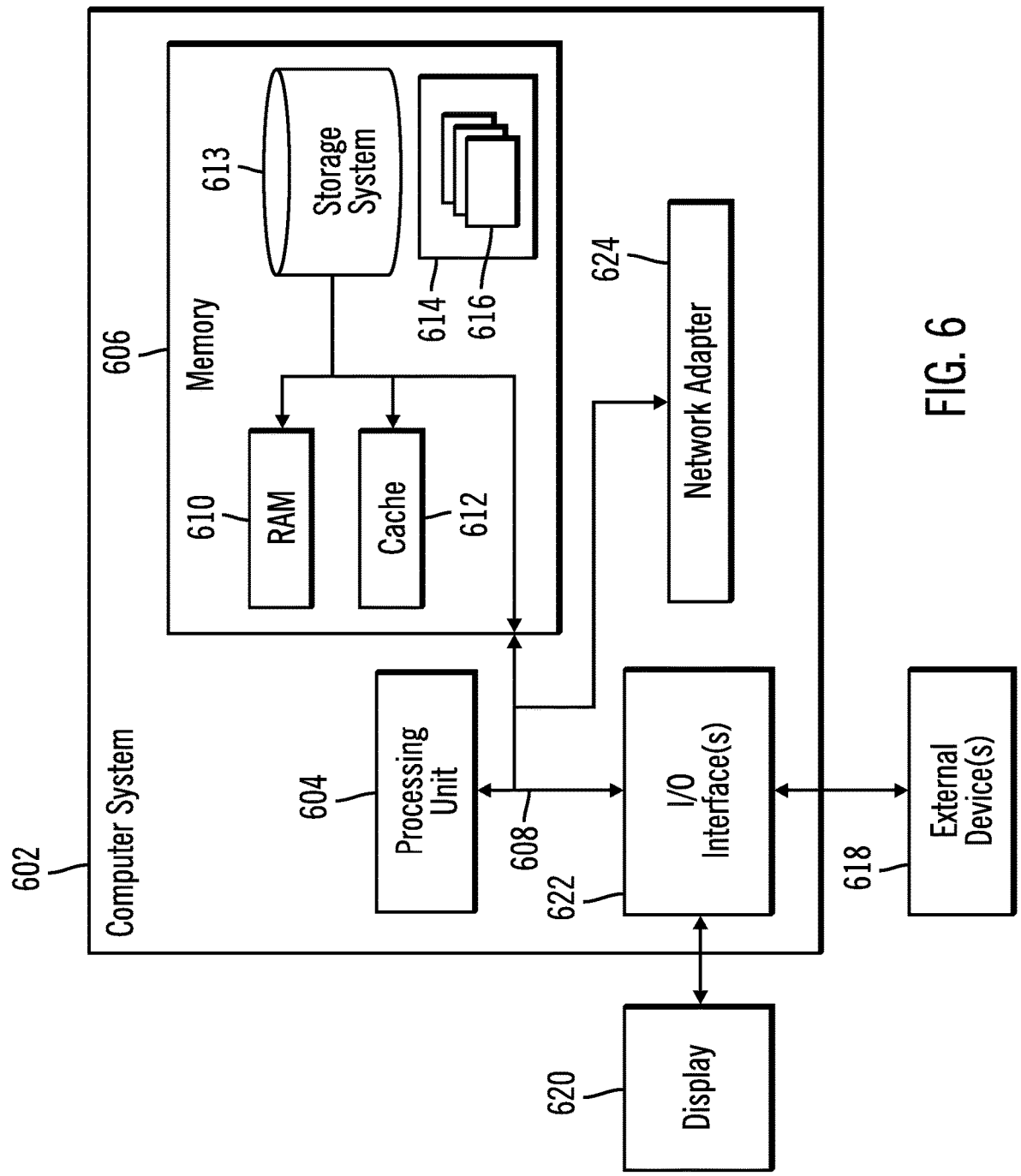
FIG. 6 illustrates a computing environment in which the components of FIG. 1 may be implemented.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing copy relationships of data in at least one storage, wherein the computer program product comprises a computer readable storage medium having program instructions embodied therewith, the program instructions executable by a processor to cause operations, the operations comprising:
   providing a first copy relationship to copy first source data on a first volume to first target data on a second volume;
   providing a second copy relationship to copy second source data on the first volume to second target data on a third volume;
   establishing a third copy relationship to copy third source data from a fourth volume to third target data in the first volume after the first and second copy relationships are established;
   indicating first overlapping data in the first source data of the first copy relationship that comprises at least a portion of the third target data in the third copy relationship to copy to the first target data; and
   indicating second overlapping data in the second source data of the second copy relationship that comprises at least a portion of the third target data in the third copy relationship to copy to the second target data.

2. The computer program product of claim 1, wherein the first and second copy relationships comprise incremental copy relationships.

3. The computer program product of claim 1, wherein the operations further comprise:
   indicating in first change information of the first copy relationship, at a server managing the first volume, the first overlapping data to copy from the first source data to the first target data in response to the server maintaining the first change information; and
   indicating in second change information of the second copy relationship, at the server, changes to the second source data to copy to the second target data in response to the server maintaining the second change information.

4. The computer program product of claim 1, wherein the operations further comprise:
   indicating in first change information of the first copy relationship, at a first server managing the second volume, changes to the first source data to copy to the first target data in response to the first server maintaining the first change information; and
   indicating in second change information of the second copy relationship, at a second server managing the third volume, changes to the second source data to copy to the second target data in response to the second server maintaining the second change information.

5. The computer program product of claim 4, wherein the operations further comprise:
   obtaining a first lock on the second volume, wherein the indicating the changes to the first source data in the first change information is performed in response to obtaining the first lock;
   releasing the first lock in response to completing the indicating the changes to the first source data;
   obtaining a second lock on the third volume, wherein the indicating the changes to the second source data in the second change information is performed in response to obtaining the second lock; and
   releasing the second lock in response to completing the indicating the changes to the second source data.

6. The computer program product of claim 1, wherein the first volume, the second volume, the third volume, and the fourth volume are implemented in a first storage, second storage, third storage, and a fourth storage, respectively, and wherein the first, storage, the second storage, the third storage, and the fourth storage are managed by a first server, a second server, a third server, and a fourth server, respectively.

7. The computer program product of claim 1, wherein the first and second copy relationships comprise one of a first type of copy relationship and a second type of copy relationship, wherein the first type of copy relationship indicates that change information for a copy relationship indicating changes in source data to copy to target data are maintained in a source server managing the source data and wherein the second type of copy relationship indicates that change information for a copy relationship indicating changes in source data to copy to target data are maintained in a target server managing the target data, wherein the operations further perform for processed copy relationships, including the first and second copy relationships:
   determining whether a processed copy relationship of the processed copy relationships having source data in a source volume to copy to target data in a target volume comprises the first type or the second type of copy relationship;
   indicating in change information of the processed copy relationship, at a server managing the source volume having the source data, overlapping data to copy from the source data to target data in response to determining the processed copy relationship comprises the first type of copy relationship; and
   indicating in change information of the processed copy relationship, at a server managing the target volume having the target data, the overlapping data to copy from the source data to target data in response to determining the processed copy relationship comprises the second type of copy relationship.

8. A system for managing copy relationships of data in at least one storage, comprising:
a processor; and
a computer readable storage medium having program instructions executed by a processor to cause operations, the operations comprising:
providing a first copy relationship to copy first source data on a first volume to first target data on a second volume;
providing a second copy relationship to copy second source data on the first volume to second target data on a third volume;
establishing a third copy relationship to copy third source data from a fourth volume to third target data in the first volume after the first and second copy relationships are established;
indicating first overlapping data in the first source data of the first copy relationship that comprises at least a portion of the third target data in the third copy relationship to copy to the first target data; and
indicating second overlapping data in the second source data of the second copy relationship that comprises at least a portion of the third target data in the third copy relationship to copy to the second target data.

9. The system of claim 8, wherein the first and second copy relationships comprise incremental copy relationships.

10. The system of claim 8, wherein the operations further comprise:
indicating in first change information of the first copy relationship, at a server managing the first volume, the first overlapping data to copy from the first source data to the first target data in response to the server maintaining the first change information; and
indicating in second change information of the second copy relationship, at the server, changes to the second source data to copy to the second target data in response to the server maintaining the second change information.

11. The system of claim 8, wherein the operations further comprise:
indicating in first change information of the first copy relationship, at a first server managing the second volume, changes to the first source data to copy to the first target data in response to the first server maintaining the first change information; and
indicating in second change information of the second copy relationship, at a second server managing the third volume, changes to the second source data to copy to the second target data in response to the second server maintaining the second change information.

12. The system of claim 11, wherein the operations further comprise:
obtaining a first lock on the second volume, wherein the indicating the changes to the first source data in the first change information is performed in response to obtaining the first lock;
releasing the first lock in response to completing the indicating the changes to the first source data;
obtaining a second lock on the third volume, wherein the indicating the changes to the second source data in the second change information is performed in response to obtaining the second lock; and
releasing the second lock in response to completing the indicating the changes to the second source data.

13. The system of claim 8, wherein the first volume, the second volume, the third volume, and the fourth volume are implemented in a first storage, second storage, third storage, and a fourth storage, respectively, and wherein the first, storage, the second storage, the third storage, and the fourth storage are managed by a first server, a second server, a third server, and a fourth server, respectively.

14. The system of claim 8, wherein the first and second copy relationships comprise one of a first type of copy relationship and a second type of copy relationship, wherein the first type of copy relationship indicates that change information for a copy relationship indicating changes in source data to copy to target data are maintained in a source server managing the source data and wherein the second type of copy relationship indicates that change information for a copy relationship indicating changes in source data to copy to target data are maintained in a target server managing the target data, wherein the operations further perform for processed copy relationships, including the first and second copy relationships:
determining whether a processed copy relationship of the processed copy relationships having source data in a source volume to copy to target data in a target volume comprises the first type or the second type of copy relationship;
indicating in change information of the processed copy relationship, at a server managing the source volume having the source data, overlapping data to copy from the source data to target data in response to determining the processed copy relationship comprises the first type of copy relationship; and
indicating in change information of the processed copy relationship, at a server managing the target volume having the target data, the overlapping data to copy from the source data to target data in response to determining the processed copy relationship comprises the second type of copy relationship.

15. A method for managing copy relationships of data in at least one storage, comprising:
providing a first copy relationship to copy first source data on a first volume to first target data on a second volume;
providing a second copy relationship to copy second source data on the first volume to second target data on a third volume;
establishing a third copy relationship to copy third source data from a fourth volume to third target data in the first volume after the first and second copy relationships are established;
indicating first overlapping data in the first source data of the first copy relationship that comprises at least a portion of the third target data in the third copy relationship to copy to the first target data; and
indicating second overlapping data in the second source data of the second copy relationship that comprises at least a portion of the third target data in the third copy relationship to copy to the second target data.

16. The method of claim 15, further comprising:
indicating in first change information of the first copy relationship, at a server managing the first volume, the first overlapping data to copy from the first source data to the first target data in response to the server maintaining the first change information; and
indicating in second change information of the second copy relationship, at the server, changes to the second source data to copy to the second target data in response to the server maintaining the second change information.

17. The method of claim 15, further comprising:
indicating in first change information of the first copy relationship, at a first server managing the second volume, changes to the first source data to copy to the first target data in response to the first server maintaining the first change information; and indicating in second change information of the second copy relationship, at a second server managing the third volume, changes to the second source data to copy to the second target data in response to the second server maintaining the second change information.

18. The method of claim 17, further comprising:

obtaining a first lock on the second volume, wherein the indicating the changes to the first source data in the first change information is performed in response to obtaining the first lock; and releasing the first lock in response to completing the indicating the changes to the first source data;

obtaining a second lock on the third volume, wherein the indicating the changes to the second source data in the second change information is performed in response to obtaining the second lock; and releasing the second lock in response to completing the indicating the changes to the second source data.

19. The method of claim 15, wherein the first volume, the second volume, the third volume, and the fourth volume are implemented in a first storage, second storage, third storage, and a fourth storage, respectively, and wherein the first, storage, the second storage, the third storage, and the fourth storage are managed by a first server, a second server, a third server, and a fourth server, respectively.

20. The method of claim 15, wherein the first and second copy relationships comprise one of a first type of copy relationship and a second type of copy relationship, wherein the first type of copy relationship indicates that change information for a copy relationship indicating changes in source data to copy to target data are maintained in a source server managing the source data and wherein the second type of copy relationship indicates that change information for a copy relationship indicating changes in source data to copy to target data are maintained in a target server managing the target data, wherein for processed copy relationships, including the first and second copy relationships, further comprising:

determining whether a processed copy relationship of the processed copy relationships having source data in a source volume to copy to target data in a target volume comprises the first type or the second type of copy relationship;

indicating in change information of the processed copy relationship, at a server managing the source volume having the source data, overlapping data to copy from the source data to target data in response to determining the processed copy relationship comprises the first type of copy relationship; and indicating in change information of the processed copy relationship, at a server managing the target volume having the target data, the overlapping data to copy from the source data to target data in response to determining the processed copy relationship comprises the second type of copy relationship.

* * * * *